(12) United States Patent
Paonessa

(10) Patent No.: US 6,877,770 B2
(45) Date of Patent: Apr. 12, 2005

(54) METHOD OF PREPARING AIR BAG MODULE AND VEHICLE SUPPORT FOR FINAL PROCESS POSITIONING

(75) Inventor: Saverio Paonessa, Belle River (CA)

(73) Assignee: KS Centaco Wheel Corporation, Windsor (CA)

( * ) Notice: Subject to any disclaimer, the term of this patent is extended or adjusted under 35 U.S.C. 154(b) by 283 days.

(21) Appl. No.: 10/001,663

(22) Filed: Oct. 23, 2001

(65) Prior Publication Data
US 2002/0053786 A1 May 9, 2002

Related U.S. Application Data

(60) Provisional application No. 60/243,830, filed on Oct. 27, 2000.

(51) Int. Cl.$^7$ ............................................... B60R 21/16
(52) U.S. Cl. ..................................................... 280/731
(58) Field of Search .............................. 280/731, 728.2, 280/743.1; 29/428, 407.1, 407.09; 72/420

(56) References Cited

U.S. PATENT DOCUMENTS

| 4,437,681 A | | 3/1984 | Adams et al. | |
|---|---|---|---|---|
| 4,793,631 A | * | 12/1988 | Takada | 280/728.2 |
| 4,915,410 A | * | 4/1990 | Bachelder | 280/732 |
| 5,064,218 A | * | 11/1991 | Hartmeyer | 280/728.2 |
| 5,152,549 A | * | 10/1992 | Aird | 280/728.2 |
| 5,239,147 A | * | 8/1993 | Allard et al. | 200/61.54 |
| 5,327,796 A | * | 7/1994 | Ernst et al. | 74/484 H |
| 5,456,488 A | | 10/1995 | Bauer | |
| 5,562,301 A | * | 10/1996 | Lutz | 280/728.2 |
| 5,564,732 A | | 10/1996 | Bauer et al. | |
| 5,564,741 A | | 10/1996 | Ward et al. | |
| 5,702,148 A | | 12/1997 | Vaughan et al. | |
| 5,904,367 A | | 5/1999 | Warnez et al. | |
| 5,924,831 A | | 7/1999 | Ricks et al. | |
| 5,947,509 A | | 9/1999 | Ricks et al. | |
| 6,042,143 A | * | 3/2000 | Luo et al. | 280/731 |
| 6,142,504 A | * | 11/2000 | Papandreou | 280/728.2 |
| 6,149,183 A | * | 11/2000 | Ford | 280/728.2 |

* cited by examiner

Primary Examiner—Faye M. Fleming
(74) Attorney, Agent, or Firm—Dykema Gossett PLLC

(57) ABSTRACT

A method of preparing an air bag module for final process positioning includes the step of providing an air bag module, the air bag module having unformed locating features for guiding the air bag module into a mountable position on a vehicle component. The method next includes the step of shaping the locating features to a predetermined size. The method may also include the step of providing a vehicle support, such as a steering wheel, with unformed locating features for guiding the air bag module into a mountable position on the vehicle support. The method may further include shaping the unformed locating features of the vehicle support to a predetermined size. The method ensures that the air bag module will consistently fit with the vehicle support and reduce an accumulation of dimensional tolerances in the components of the air bag module and vehicle support.

27 Claims, 3 Drawing Sheets

METHOD OF PREPARING AIR BAG MODULE AND VEHICLE SUPPORT FOR FINAL PROCESS POSITIONING

RELATED APPLICATION

This application claims the benefit of U.S. provisional application Ser. No. 60/243,830, filed Oct. 27, 2000, which is hereby incorporated by reference in its entirety.

FIELD OF THE INVENTION

This invention relates to the field of mounting an air bag module to a steering wheel or other motor vehicle support.

BACKGROUND OF THE INVENTION

Supplemental inflatable restraints, or air bags, are commonly secured to a steering wheel of a motor vehicle. When the air bag is deployed in a frontal impact, it helps cushion the resultant forward motion of the driver toward the steering wheel. An air bag module is mounted in its undeployed state to a steering wheel typically with a plurality of fasteners projecting from the steering wheel and/or the air bag module.

Air bag modules often employ fit and finish locating features to guide the module to a mountable position on a vehicle component through a process known as final process positioning. Once properly positioned by the locating features, i.e. placed in final process positioning, the air bag module can be secured to the vehicle support by threaded fasteners, snap-on attachments, or other conventional fasteners. After mounting, the locating features may additionally support the air bag module on the vehicle support.

In order to maintain a perception of overall quality, the position of the air bag module must be controlled precisely to present a centered position on the steering wheel, with even or consistent gaps and/or flushness between the coverings of the air bag and steering wheel. In order to achieve acceptable alignment of assembled parts, conventional production processes require careful attention to dimensional tolerances in manufacturing the components associated with air bag modules and vehicle supports. However, even with meticulous control of the manufacturing and mounting processes, the dimensional tolerances of the assembled components often accumulate so as to cause gaps, uneven mountings, misalignments, or skewed fits between the air bag module and the vehicle support.

Accordingly, there is a need for an improved method to prepare an air bag module and vehicle support for final process positioning that consistently aligns an air bag module with a vehicle support, and which reduces the accumulation of dimensional tolerances of the components in the system.

SUMMARY OF THE INVENTION

A method of preparing an air bag module for final process positioning includes the step of providing an air bag module, the air bag module having unformed locating features for guiding the air bag module into a mountable position on a vehicle component. The method also includes the step of shaping the unformed locating features to a predetermined size. The method may also include providing a vehicle support, such as a steering wheel, with unformed locating features for guiding an air bag module into a mountable position. The method may further include the step of shaping the unformed locating features of the vehicle support to a predetermined size.

A process according to the present invention provides an air bag module that consistently fits with a vehicle support. Initially, an air bag module with at least three unformed locating posts is secured in an air bag module fixture. The air bag module is then biased against the module fixture while shaping tools move toward the air bag module. The tools reduce the length of the posts to a predetermined size, and shape the posts for mounting. Next, the vehicle support for the air bag module, with unformed locating receptors corresponding to the locating posts of the air bag module, is placed in a vehicle support fixture. Shaping tools then move toward the locating receptors. The tools reduce the size of the receptors to a predetermined size, and shape the receptors for mounting. The air bag module is then in a state to be secured to the vehicle support.

One advantage of the present invention is that it provides a process for positioning an air bag module to a vehicle support in a manner that reduces the accumulation of dimensional tolerances of elements of the assembled components. It accomplishes this by shaping the fit and finish locating features after the air bag module and vehicle support are manufactured. This method ensures that the air bag module will consistently fit with the vehicle support and reduce an accumulation of dimensional tolerances.

BRIEF DESCRIPTION OF THE PREFERRED EMBODIMENT

Figure 1:
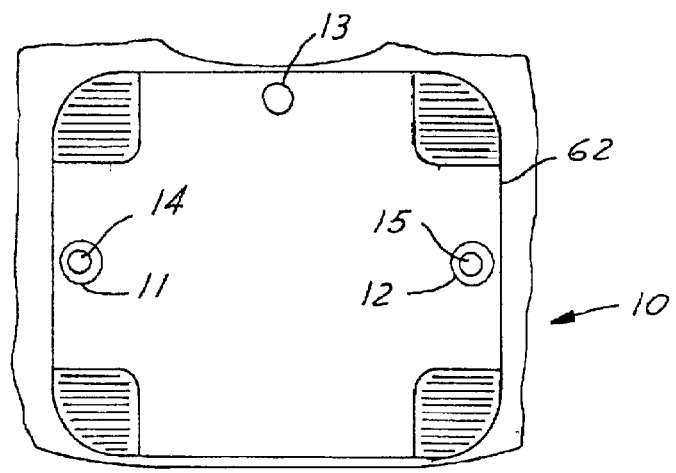
FIG. 1 is a rear elevation view of an air bag module having three formed locating posts according to the inventive method.
Figure 2:
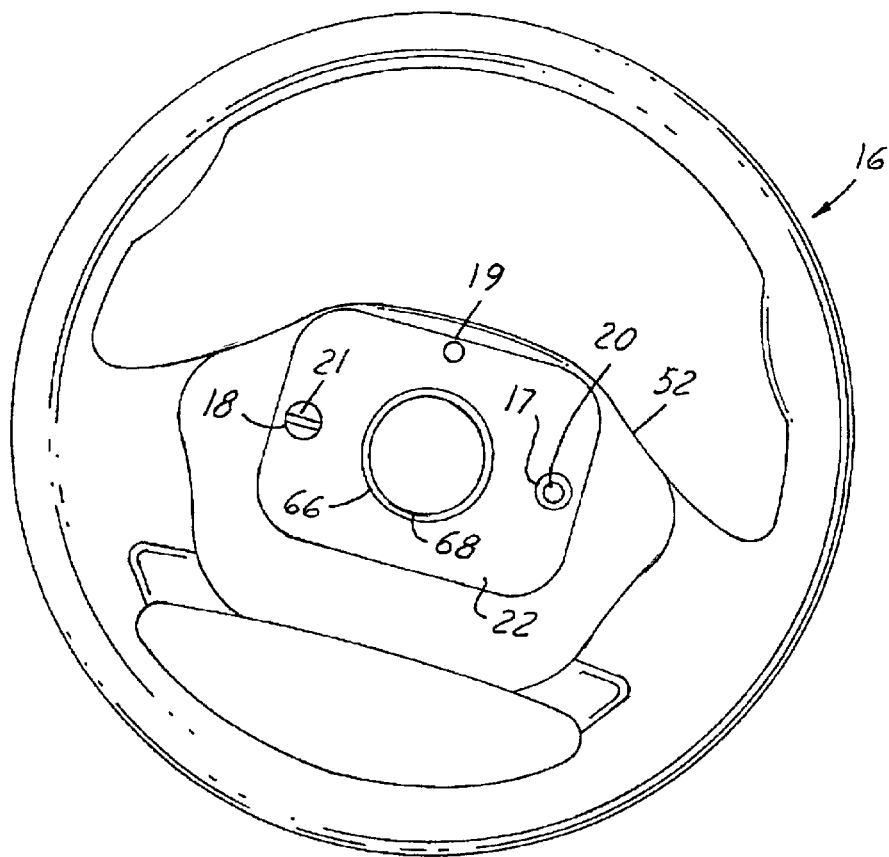
FIG. 2 is a front elevation view of a vehicle steering wheel assembly having three formed locating receptors, according to the inventive method, located on a spring loaded support base, the support base attached to the steering wheel assembly.

Referring now to the drawings wherein like reference numerals are used to identify identical components in the various views, FIGS. 1 and 2 show an air bag module 10 and a vehicle support, in this case a steering wheel 16, that have been prepared for final process positioning according to the inventive method. FIG. 1 shows an air bag module 10 with three formed locating features 11, 12, 13. The air bag module 10 is known in the art and may include a housing (not shown), a module base 62, an inflator (not shown), and a cushion (not shown).

Locating features 11, 12, 13 are for guiding the air bag module 10 into a mountable position on a vehicle support during final process positioning. As shown in FIG. 1, the locating features in the preferred embodiment are locating posts 11, 12, 13. Locating posts 11, 12, 13 extend from module base 62. Locating posts 11, 12, 13 may be made out of, for example, plastic or metal. The locating posts 11, 12, 13 cooperatively provide a base, and define a plane in which the top exterior surface 24 of the air bag module will lie. The ends of two locating posts 11, 12 are provided with distal tips 14, 15, respectively. As discussed below, formed distal tips 14, 15 have shaped projections.

FIG. 2 shows a vehicle support—a steering wheel 16 having three formed locating features 17, 18, 19, according to the inventive method. It will be recognized by those skilled in the art that additional vehicle supports may be employed such as a vehicle dashboard, head rail, vehicle door, headliner, and the like. The locating features 17, 18, 19 are secured to a support base 22. The support base 22 is attached to a hub 52 of the steering wheel 16. Steering wheel 16 is provided with a clearance hole 66 and shaft hole 68.

Shaft hole 68 is located within hub 52, and permits a bolt or other means for attachment to secure hub 52 to a steering wheel shaft, not shown. Clearance hole 66 permits tools to access shaft hole 68 in order to reach and secure or remove the bolt or other means for attaching hub 52 to the steering wheel shaft.

Figure 5:
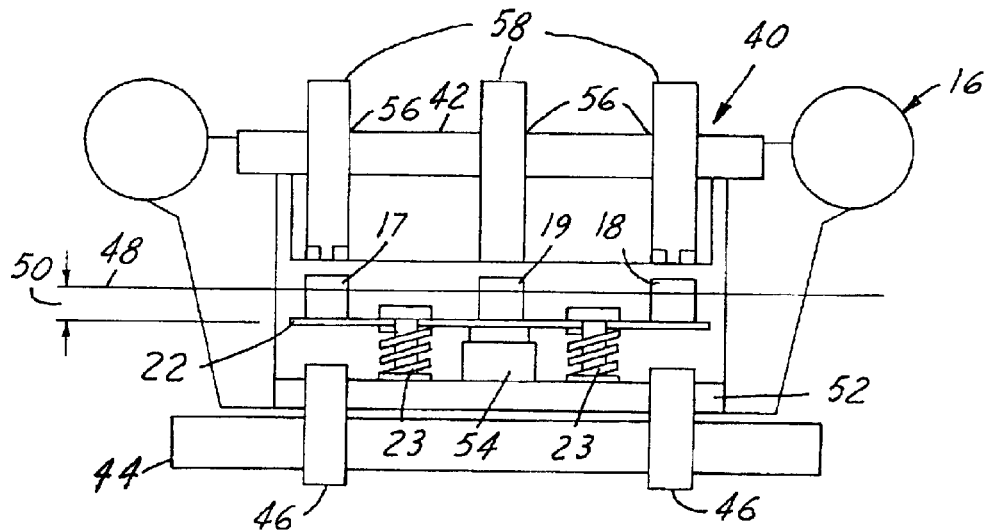
FIG. 5 is a sectional view of a steering wheel secured in the vehicle support fixture, with shaping tools separate from unformed locating receptors of the steering wheel.
Figure 6:
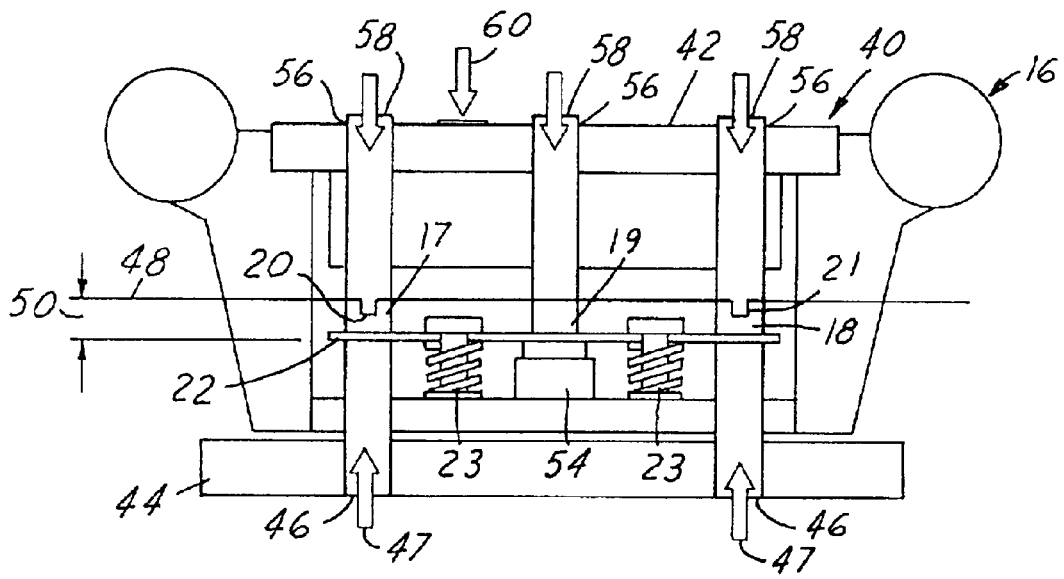
FIG. 6 is a sectional view of the steering wheel of FIG. 5 secured in the vehicle support fixture, with the shaping tools forming the locating receptors of the steering wheel.
Figure 7:
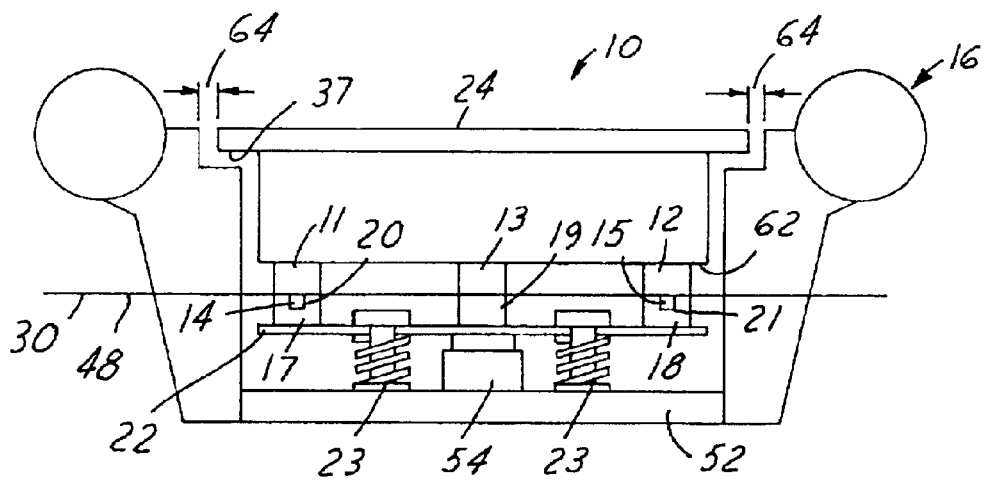
FIG. 7 is sectional view of the air bag module of FIG. 4 positioned for mounting to the steering wheel of FIG. 6.

The support base 22 is biased away from the steering wheel hub 52 by springs 23 as shown in FIGS. 5–7. As further shown in FIGS. 5–7, between support base 22 and hub 52 is a switch 54 that activates a horn, not shown. Switch 54 is activated when a driver applies pressure to air bag module 10, which transmits force to support base 22, and compresses springs 23 to activate switch 54. Upon release of such pressure, springs 23 return support base 22 and air bag module 10 to an initial position and deactivate switch 54. While FIGS. 5–7 show one switch 54 between support base 22 and hub 52, it will be appreciated by those skilled in the art that more than one switch may be employed, and located in a plurality of positions between support base 22 and hub 52. This type of assembly, having one or more switches 54 between a support base 22 separated from a steering wheel hub 52 by springs 23, is sometimes referred to as a "floating horn system."

As shown in the preferred embodiment of FIG. 2, locating features 17, 18, 19 are locating receptors. Locating receptors 17, 18, 19 may be made out of, for example, plastic or metal. Locating receptors 17, 18, 19 of the steering wheel 16 are engagable with the locating posts 11, 12, 13 of the air bag module. Two locating receptors 17, 18 are provided with apertures 20, 21. Apertures 20, 21 are complementary with the two distal tips 14, 15 of the locating posts 11, 12. It will be recognized by those skilled in the art that more than three locating posts and receptors may be employed as fit and finish locators, but that three are the minimum number required to define a plane in which the top exterior surface 24 of the air bag module will lie.

Figure 3:
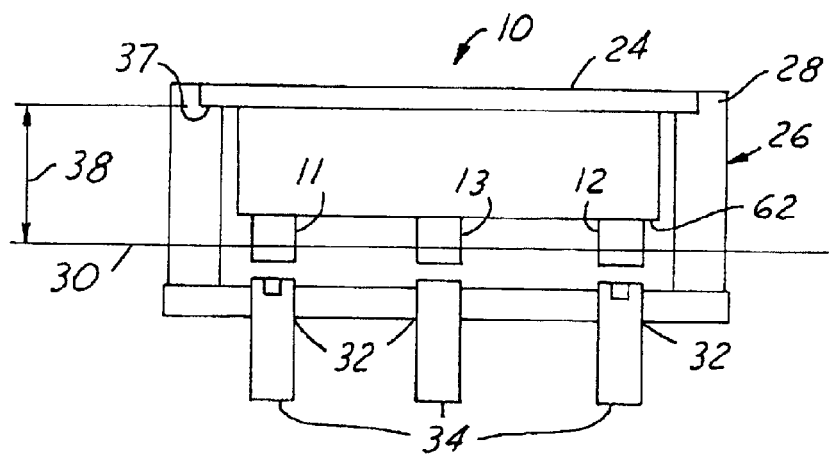
FIG. 3 is a sectional view of an air bag module secured in an air bag module fixture, with shaping tools separate from unformed locating posts of the air bag module.

FIG. 3 demonstrates the first step of the inventive method. An air bag module 10 is placed in an air bag module fixture 26. Locating posts 11, 12, 13 of air bag module 10 in FIG. 3 are unformed when placed in air bag module fixture 26.

Air bag fixture module 26 includes a frame 28 for securing the module 10 such that the locating posts 11, 12, 13 are suspended below an imaginary reference line 30. The reference line 30 is set at a predetermined distance, termed the reference length 38, between a lower cover surface 37 of the air bag module 10 and the preferred end point of the locating posts 11, 12, 13. The reference length is a function of the distance required between the air bag module 10 and vehicle support 16 which provides a consistent aligned fit of the air bag module 10 to the vehicle support 16. The air bag module fixture 26 also has apertures 32 in the support base of the frame 28 to permit shaping tools 34 to access the locating posts 11, 12, 13.

Figure 4:
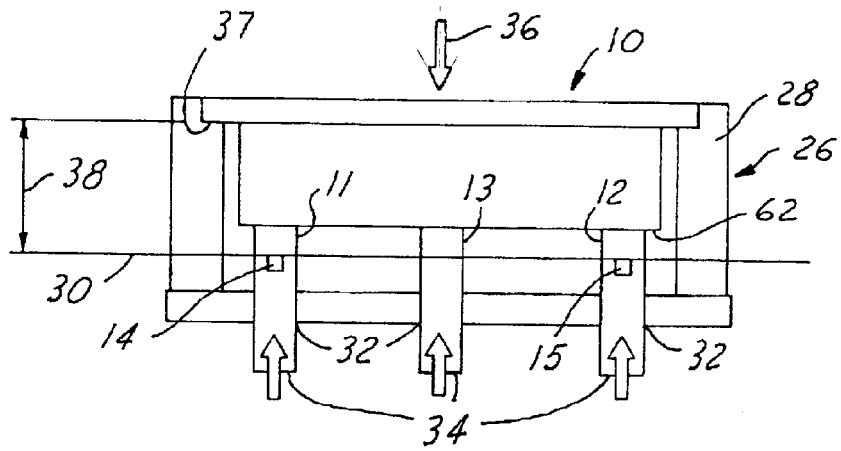
FIG. 4 is a sectional view of the air bag module of FIG. 3, secured in an air bag module fixture, with shaping tools forming the locating posts of the air bag module.

FIG. 4 represents the next step of the inventive method. The air bag module 10 is secured in fixture 26 by any suitable means for biasing the module toward the fixture, such as a spring, hydraulic press, brace, or other device that can generate a retaining force 36. While the air bag module 10 is secured, shaping tools 34 move through the apertures 32 toward the locating posts 11, 12, 13. The shaping tools 34 reduce the length of the locating posts 11, 12, 13 until the reference length 38 is reached. The shaping tools 34 additionally shape at the distal tips 14, 15 of the locating posts 11, 12, so that they may be mated in apertures 20, 21 of the corresponding locating receptors 17, 18. In a preferred embodiment, the distal tip 14 of locating post 11 is pin shaped to fit in a complementary hole-shaped aperture 20 of receptor 17. The pin 11 and hole 20 engagement provides a means for locating the mounting position of the air bag module 10 on vehicle support 16.

The distal tip 15 of locating post 12 is also pin shaped and mates in a slot shaped aperture 21 of corresponding receptor 18. This combination prevents the air bag module 10 from rotating about the tip 14 of post 11. It will be recognized by those skilled in the art that tip 15 may alternatively be shaped with a tab, or coin shaped projection to mate with the slot shaped aperture 21. Additional combinations other than a tab and slot may be employed such as a cross shape, star shape, cube, or pyramid, all of which may also provide a means for preventing the air bag module 10 from rotating about the pin and hole combination of post 11 and receptor 17.

The remaining locating post 13 and receptor 19 are not required to be mateable. Locating post 13 may flushly meet corresponding receptor 19. The heights, or lengths, of locating posts 11, 12, 13 and receptors 17, 18, 19 control the relative distance between air bag module 10 and steering wheel 16. The combination of distal tips 14, 15 and apertures 20, 21, respectively, control the lateral position of the air bag module 10 while it is positioned to be secured to steering wheel 16.

Accordingly, locating posts 11, 12, 13 may be shaped both to reduce the length of the posts, and to form projections out of at least two distal tips 14, 15.

FIG. 5 demonstrates the next step of the inventive method. The steering wheel 16 is placed in a vehicle support fixture 40. Locating receptors 17, 18, 19 of steering wheel 16 in FIG. 5 are unformed when placed in vehicle support fixture 40. That is, the locating features of the vehicle support are unshaped upon placement of the steering wheel 16 in the vehicle support fixture 40.

The fixture 40 includes a frame 42 for securing the steering wheel 16, and a fixture base 44. The fixture base has base supports 46 to secure the steering wheel support base 22 and to prevent compression of the steering wheel support base springs 23. The base supports 46 secure the steering wheel support base 22 such that the locating receptors 17, 18, 19 are secured above a second reference line 48. The reference line 48 is set at a distance, the reference height 50, above support base 22 to denote the position of an optimal height of locating receptors 17, 18, 19 that will provide a consistent aligned fit of the air bag module 10 to the steering wheel 16. The vehicle support fixture frame 42 has apertures 56 to permit shaping tools 58 to access the locating receptors 17, 18, 19.

FIG. 6 represents the next step of the inventive method. The steering wheel 16 is secured in fixture 40 by a means for biasing the steering wheel 16 against the fixture 40 by a force 60 provided by a spring, hydraulic press, brace, or other device can generate a retaining force. The base supports 46, or other means for supplying a force 47, such as springs, engage the support base 22 to prevent compression of support base springs 23 during the shaping of the locating receptors 17, 18, 19. With the steering wheel 16 secured, shaping tools 58 move toward the locating receptors 17, 18, 19 and reduce the size of the locating receptors until the reference height 50 is reached. The shaping tools 58 additionally shape the apertures 20, 21 to receive the corresponding distal tips 14, 15 of the locating posts 11, 12.

Accordingly, locating receptors 17, 18, 19 may be shaped to reduce the length of the receptors, and to shape apertures 20, 21 in at least two receptors 17, 18.

Finally, FIG. 7 demonstrates the last step of the inventive method. The air bag module 10 is placed in final process positioning for mounting it to the vehicle support 16. Air bag module 10 may be secured to the vehicle support 16 by one or more fasteners, such as threaded fasteners or snap-in elements (not shown) extending between the base 22 and module 10. Such fasteners may be distinct and separate from posts 11, 12, 13 and receptors 17, 18, 19. For example, such snap-on fasteners are disclosed in U.S. Pat. Nos. 5,741,025 and 5,947,509.

As seen in FIG. 7, locating posts 11, 12, 13 cooperate with locating receptors 17, 18, 19 to position the top exterior surface 24 of the air bag module 10 at a uniform distance 64 from the steering wheel 18. While FIG. 7 only depicts a uniform distance 64 in one dimension, it will be appreciated by those skilled in the art that such a uniform distance may be provided between the air bag module 10 and vehicle support 16 in other dimensions as well. Moreover, it should also be appreciated that the uniform distance 64 may be set such that the top exterior surface 24, or any other component of the air bag module 10, is flush with the vehicle support 16.

It should also be appreciated that posts 11, 12, 13 and receptors 17, 18, 19 can be formed of either metal or plastic. If they are made of metal, the shaping operations will of course require the cutting and machining of metal. If they are formed of thermoplastic material, it will be possible to perform the desired shaping by pressing a thermoforming tool, heat stake, or other hot tool against the posts and receptors. Moreover, it will be appreciated by those skilled in the art that, alternatively, the locating receptors may be shaped on the locating features of the air bag module 10, and locating posts may be shaped on the locating features of the steering wheel 16.

With the locating posts 11, 12, 13 and locating receptors 17, 18, 19 shaped after the manufacture of the air bag module 10 and steering wheel 16, the accumulated dimensional tolerances from the components of the air bag module 10 and steering wheel 16 are significantly reduced. The end result is an air bag module 10 that consistently fits and is properly aligned within its vehicle support 16.

While the invention has been particularly shown and described with reference to the preferred embodiments thereof, it is well understood by those skilled in the art that various changes and modifications can be made to the inventive method without departing from the spirit and scope of the invention.

I claim:

1. A method of preparing an air bag module for final process positioning comprising the steps of:

providing an air bag module, the air bag module having unformed locating features for guiding the air bag module into a mountable position on a vehicle component, and shaping the unformed locating features to a predetermined size, wherein the air bag module includes a base, and wherein the unformed locating features comprise at least three locating features extending from the base, and wherein the locating features comprise posts, and the shaping step further comprises the step of shaping projections out of the distal ends of at least two of the at least three posts.

2. A method of preparing an air bag module for final process positioning comprising the steps of:

providing an air bag module, the air bag module having unformed locating features for guiding the air bag module into a mountable position on a vehicle component, and shaping the unformed locating features to a predetermined size, wherein the air bag module includes a base, and wherein the unformed locating features comprise at least three locating features extending from the base, and wherein the locating features comprise receptors, and wherein the shaping step further comprises the step of shaping apertures in at least two of the at least three receptors.

3. A method of preparing an air bag module for final process positioning comprising the steps of:

providing an air bag module, the air bag module having unformed locating features for guiding the air bag module into a mountable position on a vehicle component, and shaping the unformed locating features to a predetermined size, wherein the air bag module includes a base, and wherein the unformed locating features comprise at least three locating features extending from the base, and wherein the shaping step comprises thermoforming.

4. A method of preparing an air bag module for final process positioning comprising the steps of:

providing an air bag module, the air bag module having unformed locating features for guiding the air bag module into a mountable position on a vehicle component, and shaping the unformed locating features to a predetermined size, and wherein the predetermined size is configured to reduce a variation of an installed position of the air bag module relative to a desired position of the air bag module.

5. A method of preparing an air bag module vehicle support for final process positioning comprising the steps of:

providing a vehicle support, the vehicle support having a set of unformed locating features for guiding an air bag module into a mountable position on the vehicle support; and shaping the set of unformed locating features to a predetermined size, wherein the locating features comprise at least three features extending from the vehicle support, and wherein the locating features comprise receptors, and wherein the shaping step further comprises the step of shaping apertures in at least two of the at least three receptors.

6. A method of preparing an air bag module vehicle support for final process positioning comprising the steps of:
providing a vehicle support, the vehicle support having a set of unformed locating features for guiding an air bag module into a mountable position on the vehicle support; and
shaping the set of unformed locating features to a predetermined size,
wherein the locating features comprise at least three features extending from the vehicle support,
and wherein the locating features comprise posts, and the shaping step further comprises the step of shaping projections out of the distal ends of at least two of the at least three posts.

7. A method of preparing an air bag module vehicle support for final process positioning comprising the steps of:
providing a vehicle support, the vehicle support having a set of unformed locating features for guiding an air bag module into a mountable position on the vehicle support; and
shaping the set of unformed locating features to a predetermined size,
and wherein the shaping step comprises thermoforming.

8. A method of preparing an air bag module vehicle support for final process positioning comprising the steps of:
providing a vehicle support, the vehicle support having a set of unformed locating features for guiding an air bag module into a mountable position on the vehicle support; and
shaping the set of unformed locating features to a predetermined size,
and wherein the predetermined size is configured to reduce a variation of an installed position of the air bag module relative to a desired position of the air bag module.

9. A method of preparing an air bag module and a vehicle support for final process positioning comprising the steps of:
providing an air bag module, the air bag module having a first set of unformed locating features for guiding the air bag module into a mountable position on a vehicle support;
shaping the first set of locating features to a predetermined size;
providing a vehicle support, the vehicle support having a second set of unformed locating features for guiding the air bag module into a mountable position on the vehicle support; and
shaping the second set of unformed locating features to a predetermined size.

10. The method of claim 9 wherein the first set of locating features is engageable with the second set of locating features.

11. The method of claim 9 wherein the air bag module includes a base, and the first set of unformed locating features comprise at least three locating features extending from the base; and wherein the second set of unformed locating features comprise at least three locating features extending from the vehicle support.

12. The method of claim 11 wherein the first set of unformed locating features comprise posts, the shaping of the first set of unformed locating features comprise the step of shaping projections out of the distal ends of at least two of the at least three posts; and wherein the second set of unformed locating features comprise receptors, and wherein the shaping of the second set of unformed locating features comprise the step of shaping apertures in at least two of the at least three receptors.

13. The method of claim 11 wherein the first set of unformed locating features comprise receptors, the shaping of the first set of unformed locating features comprise the step of shaping apertures in at least two of the at least three receptors; and wherein the second set of unformed locating features comprise posts, and wherein the shaping the second set of unformed locating features comprise the step of shaping projections out of the distal ends of at least two of the at least three posts.

14. The method of claim 9 wherein the shaping of the first set of unformed locating features and the shaping of the second set of unformed locating features comprises thermoforming.

15. The method of claim 9 wherein the vehicle support comprises a steering wheel.

16. The method of claim 15, wherein the air bag module and steering wheel comprise an air bag module and steering wheel for a floating horn system.

17. The method of claim 9 wherein the predetermined size is configured to reduce a variation of an installed position of the air bag module relative to a desired position of the air bag module.

18. The method of claim 9 wherein the predetermined size of the first set of locating features and the predetermined size of the second set of locating features are configured to provide a uniform distance in at least one dimension between the air bag module and the vehicle support when the air bag module is secured to the vehicle support.

19. A method of preparing an air bag module and a vehicle support for final process positioning comprising the steps of:
providing an air bag module having a first set of unformed locating features extending therefrom;
shaping the first set of locating features to a predetermined size;
providing a vehicle support having a second set of unformed locating features extending therefrom;
shaping the second set of unformed locating features to a predetermined size;
engaging the first set of locating features with the second set of locating features; and securing the air bag module to the vehicle support.

20. The method of claim 19, wherein the step of shaping the first set of locating features to a predetermined size further comprises the steps of securing the air bag module in an air bag module fixture, and reducing the length of the first set of locating features to a distance that provides a consistent aligned fit between the air bag module and the vehicle support when the air bag module is secured to the vehicle support.

21. The method of claim 20, wherein the step of shaping the first set of locating features to a predetermined size further comprises the step of determining a distance that provides a consistent aligned fit between the air bag module and the vehicle support, wherein the step of determining further comprises measuring a distance between a lower cover surface of the air bag module and the preferred end point of each of the first set of locating features.

22. The method of claim 19, wherein the step of providing an air bag module having a first set of unformed locating features extending therefrom further comprises the step of providing at least three locating features, and wherein the step of shaping the first set of locating features to a predetermined size further comprises forming distal tips in two of the locating features.

23. The method of claim 19, wherein the step of shaping the second set of locating features to a predetermined size further comprises the steps of securing the vehicle support in a vehicle support fixture, and reducing the length of the second set of locating features to a distance that provides a consistent aligned fit between the air bag module and the vehicle support when the air bag module is secured to the vehicle support.

24. The method of claim 23, wherein the step of shaping the second set of locating features to a predetermined size further comprises the step of determining a distance that provides a consistent aligned fit between the air bag module and the vehicle support, wherein the step of determining further comprises measuring a distance between top of the surface of the vehicle support and the preferred end point of each of the second set of locating features.

25. The method of claim 19, wherein the step of providing a vehicle support having a second set of unformed locating features extending therefrom further comprises the step of providing at least three locating features, and wherein the step of shaping the second set of locating features to a predetermined size further comprises shaping apertures in at least two of the locating features.

26. The method of claim 25, wherein the steps an air bag module comprises the step of providing an air bag module for a floating horn system, and wherein the step of providing a vehicle support comprises the step of providing a steering wheel, of providing a vehicle support comprises the step of providing.

27. The method of claim 19, wherein the steps of shaping the first set of locating features to a predetermined size and shaping the second set of unformed locating features to a predetermined size further comprise configuring the first and second sets of unformed locating features to provide a uniform distance in at least one dimension between the air bag module and the vehicle support when the air bag module is secured to the vehicle support.

* * * * *